United States Patent Office 2,693,470
Patented Nov. 2, 1954

2,693,470

BENZ-QUINOLINE COMPOUNDS AND PROCESS FOR THE MANUFACTURE THEREOF

Franz Bergel, London, Aaron Cohen, Frank Ratcliffe Atherton, and Basil Heath-Brown, Welwyn Garden City, and Edward Graham Hughes, Runcorn, England, assignors to Hoffmann-La Roche Inc., Nutley, N. J., a corporation of New Jersey No Drawing. Application March 17, 1952,
Serial No. 277,092

Claims priority, application Great Britain
March 22, 1951

11 Claims. (Cl. 260—286)

The present invention is concerned with 1-methyl-1,2,3,4-tetrahydro - 5,6 - benz - quinoline - 3 - carboxylic acid, 1 - methyl - 1,2,3,4 - tetrahydro-5,6-benz-quinoline-3-carboxylic acid methylamide, novel intermediates used in the manufacture thereof, and with a process for the manufacture of these substances and said intermediates.

According to the invention there is provided a process which comprises treating a 1-dialkylaminomethyl (including 1-piperidinomethyl- and 1-morpholinomethyl-)-2-hydroxy-naphthalene with a methane derivative of the kind $CH_2(X)Y$, wherein X is a carbalkoxy, carbobenzyloxy, or cyano and Y is a carbalkoxy or carbobenzyloxy, in the presence of an alkali-metal, converting the 3-substituted 3,4-dihydro-5,6-benz-coumarin so obtained by hydrogenolysis, when the substituent is carbobenzyloxy, or by alkaline hydrolysis into 3-carboxy-3,4-dihydro-5,6-benz-coumarin or [2-hydroxy-naphthyl-(1)]-methyl malonic acid respectively, treating either of the latter products with a primary or secondary amine of the kind $NH(R')(R'')$, wherein R' may be hydrogen (when R'' is methyl) or methyl or ethyl and R'' is methyl, ethyl or benzyl, or R' and R'' together with the nitrogen atom represents piperidino or morpholino, and formaldehyde and heating the resulting 3-[2-hydroxy-naphthyl-(1)]-2-carboxy-propyl amine derivative or an alkali-metal salt thereof with methylamine under pressure and, in the case where the free acid is used, hydrolysing the product.

The 3-carboxy-3,4-dihydro-5,6-benz-coumarin and the [2-hydroxy-naphthyl-(1)]-methyl malonic acid are interconvertible. The former can be changed into the latter by treatment with alkali while the reverse change takes place on treatment with acid. Accordingly the process described hereinbefore may be varied in that it may include such a conversion step.

The present invention also includes the formation of the required 1-methyl-1,2,3,4-tetrahydro-5,6-benz-quinoline-3-carboxylic acid from [2-hydroxy-naphthyl-(1)]-methyl malonitrile which comprises treating the latter with alkali to give [2-hydroxy-naphthyl-(1)]-methyl malonic acid which, after lactonisation if desired, is treated as indicated hereinbefore.

The 1 - dialkylaminomethyl - 2 - hydroxy-naphthalenes used as initial materials in the principal embodiment of the present invention may be prepared by reacting 2-hydroxy-naphthalene with the appropriate amine and formaldehyde. The [2 - hydroxy-naphthyl-(1)] - methyl malonitrile used as initial material in the further embodiment of the present invention may be prepared by heating an alcoholic solution of 1-dimethylaminomethyl-2-hydroxy-naphthalene under reflux and slowly adding a molecular equivalent of malonitrile.

The initial step involving the treatment of a 1-dialkyl-aminomethyl-2-hydroxy-naphthalene with a methane derivative in the presence of an alkali-metal may best be conducted in a solvent or diluent which is inert under the conditions of the reaction. A non-polar solvent such as xylene has been found to be satisfactory. Sodium is a convenient alkali-metal for use in this step.

The removal of the benzyl group from the 3-carbobenzyloxy-3,4-dihydro-5,6-benz-coumarin may be brought about by hydrogenolysis or hydrolysis. The former is effected by catalytic hydrogenation—conveniently with a prereduced catalyst consisting of Adams palladium oxide and 10% palladium charcoal in substantially equal amounts—in a solvent such as dry ethyl acetate. The latter is effected by treatment with alkali (about two or three equivalents have been found satisfactory) under mild conditions, that is to say, without heating, followed by addition of an equivalent quantity of acid in the cold. The hydrolysis not only removes the benzyl group but opens the lactone ring to give [2-hydroxy-naphthyl-(1)]-methyl malonic acid. This substance can be used for the further steps or may be lactonized by treatment with hydrobromic acid.

The removal of the alkyl group from the 3 carbalkoxy-3,4-dihydro-5,6-benz-coumarin is brought about by hydrolysis in a similar manner to that used for the hydrolysis of the benzyl ester and gives the same product. This product is also obtained from 3-cyano-3,4-dihydro-5,6-benz-coumarin and from [2-hydroxy-naphthyl-(1)]-methyl malonitrile by treatment with excess alkali under more vigorous conditions, that is to say, for example, by heating these substances under reflux with several moles of the alkali.

If it is desired to open the lactone ring of the 3-carboxy-3,4-dihydro-5,6-benz-coumarin it may be treated with cold alkali followed by treatment with an equivalent quantity of acid in the cold.

The 1-[substituted-aminomethyl]-2-[2'-hydroxy-naphthyl-(1')]-propionic acids are prepared from 3-carboxy-3,4-dihydro-5,6-benz-coumarin or from [2-hydroxy-naphthyl-(1)]-methyl malonic acid by treatment with appropriately substituted secondary amines and formaldehyde. The reaction proceeds in an aqueous medium in the cold.

The conversion of these propionic acid derivatives to 1-methyl-1,2,3,4-tetrahydro-5,6-benz-quinoline-3-carboxylic acid can be brought about in either of two ways. Thus, their alkali-metal salts may be heated under pressure with methylamine or the free acids may be heated under pressure with methylamine and the resulting methylamide hydrolysed. The former method is preferred.

The various steps of the process may be set out as follows:

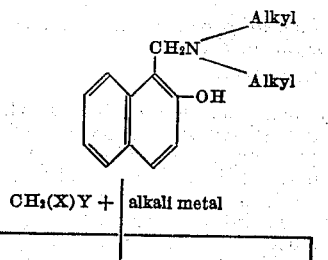

$CH_2(X)Y$ + alkali metal

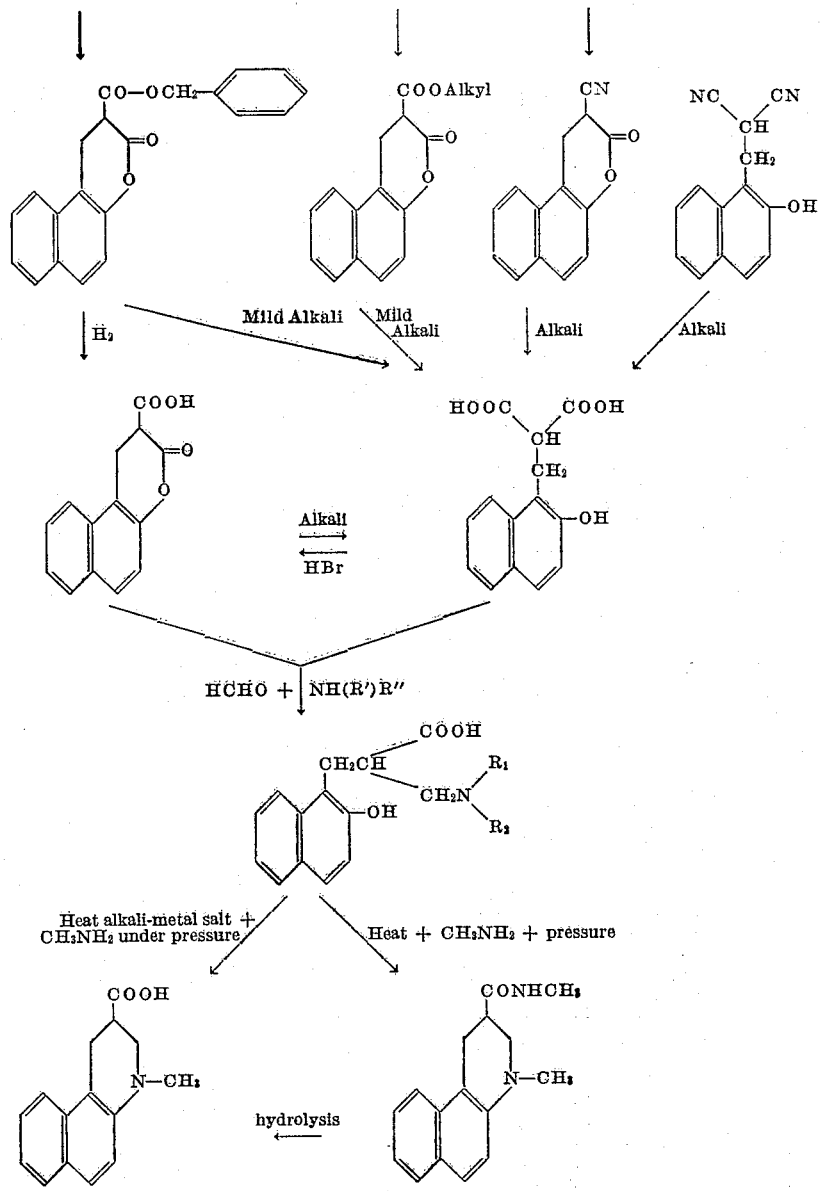

wherein X, Y, R', R" and N(R')R" have the values previously indicated.

The 1-methyl-1,2,3,4-tetrahydro-5,6-benz-quinoline-3-carboxylic acid is useful in that it has some oxytocic activity, a long-lasting narcotic activity and an analgesic action when administered in sub-narcotic doses.

The following example will serve to illustrate the invention:

EXAMPLE

A1. *The preparation of 3,4-dihydro-5,6-benz-coumarin-3-carboxylic acid esters*

(a) THE ETHYL ESTER

A solution of diethyl malonate (8.0 g.) in dry xylene (35 ml.) was added to a stirred suspension of sodium powder (1.15 g.) in pure dry xylene (17.5 ml.) and warmed at 75–80° C. until all the sodium metal had reacted to form sodio-malonic diethyl ester. A solution of α-dimethylaminomethyl-β-naphthol (10.5 g.) in xylene (175 ml.) was then added with stirring, the temperature being raised to 100–110° C., and the heating and stirring continued for 10 hours, during which period at least 75% of the dimethylamine eliminated during the course of the reaction could be trapped in a receiver containing standard acid.

The cooled reaction mixture was made acid with cold dilute hydrochloric acid and shaken. The separated xylene solution was filtered clean, warmed and evaporated or treated with light petroleum (B. P. 60–80° C.) when 3,4-dihydro-5,6-benz-coumarin-3-carboxylic acid ethyl ester was obtained as a white powder. This was collected, washed with water and dried. Yield: 78%. After recrystallization from alcohol it melted at 115–116° C.

(b) THE BENZYL ESTER (i) A solution of dibenzyl malonate (28.4 g.=0.1 mol) in toluene (100 ml.) was added to powdered sodium (2.3 g.=0.1 mol) in toluene (100 ml.). The mixture was warmed in an oil bath (ca. 90° C.) and a clear solution was formed.

1 - dimethylaminomethyl - 2 - hydroxy - naphthalene (20.1 g.=0.1 mol) in toluene (150 ml.) was added and the mixture stirred and heated in an oil bath (ca. 120° C.) for four and a half hours under nitrogen. The reaction mixture was allowed to stand for 16 hours and then acidified with dilute hydrochloric acid (150 ml. 2 N) whereby the solid dissolved and a pinkish-white solid crystallised out. This solid was filtered off and washed successively with water, benzene and petroleum ether (B. P. 40–60° C.), air dried and then dried over phosphorus pentoxide. It melted at 145–146° C. [Yield 17.15 g.]

The solvent phase was washed twice with sodium bicarbonate (100 ml. each) and twice with water (100 ml. each) and dried over sodium sulphate. It was then evaporated under reduced pressure to small bulk (100 ml.) and petroleum ether (B. P. 40–60° C.) was added giving an oil which solidified. The solid was filtered and triturated and washed with petroleum ether (B. P. 40–60° C.). It melted at 126–129° C. [yield=7.05 g.] which was undepressed in a mixed melting point with the first crop. On recrystallisation from benzene (20 ml.), filtering and washing with methanol and petroleum ether (B. P. 40–60° C.) crystals melting at 144–145° C. [yield=3.7 g.] were obtained.

The combined crops (20.85 g.) were recrystallised from benzene (150 ml.) and gave crystals of pure 3-carbobenzyloxy-3,4-dihydro-5,6-benz-coumarin [yield= 17.1 g.=51% overall] which melted at 146–147° C.

(ii) The process of (i) above was repeated on twice the scale (i. e. 0.2 mol starting materials and double quantities of solvents, etc.) except that the reactants were heated for 5 hours at 120° C. and the combined crops were recrystallised from toluene (400 ml.). The product [yield 41 g.=62% overall] melted at 146–147° C.

A2. *The preparation of 3-cyano-3,4-dihydro-5,6-benz-coumarin*

A solution of ethyl cyanoacetate (5.65 g.) in xylene (35 ml.) was added to a stirred suspension of sodium powder (1.15 g.) in pure dry xylene (17.5 ml.) and warmed at 70–80° C. until all the sodium metal had reacted with the ethyl cyanoacetate. A solution of α-dimethylaminomethyl-β-naphthol (10.05 g.) in xylene (100 ml.) was then added, the temperature being raised to 100–110° C., and the heating continued for 4 hours, during which period at least 87% of the dimethylamine eliminated during the course of the reaction could be trapped in a receiver containing standard acid.

The cooled reaction mixture was made acid and shaken and the solid 3-cyano-3,4-dihydro-5,6-benz-coumarin filtered off, washed with water and ether and then dried. Yield 85% as a white powder. It was purified by rapid recrystallisation from ethyl acetate and light petroleum (B. P. 60–80° C.) or from glacial acetic acid; M. P. 191° C.

A3. *The preparation of [2-hydroxy-naphthyl-(1)]-methyl-malonitrile*

A solution of 1-dimethylaminomethyl-2-hydroxy-naphthalene (301.5 g.=1.5 mol) in ethanol (750 ml.) was heated under reflux while stirring. A solution of malonitrile (99 g.=1.5 mol) was then slowly added dropwise over a period of one and a half hours. The mixture was heated under reflux for a further one and a half hours and allowed to stand for 16 hours. It was then filtered, washed with ethanol and 40/60° petrol-ether and air dried. The product melted at 214–216° C. The yield amounted to 72% (239 g.).

B1. *The preparation of [2-hydroxy-naphthyl-(1)]-methyl-malonic acid*

(a) BY HYDROLYSIS OF ETHYL 3,4-DIHYDRO-5,6-BENZ-COUMARIN-3-CARBOXYLATE

A mixture of this ester (13.5 g.=0.5 mol) and dilute sodium hydroxide solution (125 ml. ca. 2 N) was refluxed for three hours. At the end of this period the reaction mixture was ice-cooled and treated with a quantity of dilute hydrochloric acid equivalent to the sodium hydroxide used for the hydrolysis. Crystallisation soon commenced and the mixture was then refrigerated for several hours. The solid was then filtered, washed with water and dried in vacuo over phosphorus pentoxide. The yield of [2-hydroxynaphthyl-(1)]-methyl-malonic acid monohydrate amounted to 79% (11 g.). The material melted at 125–126° C. with loss of carbon dioxide.

(b) BY HYDROLYSIS OF 3-CYANO-3,4-DIHYDRO-5,6-BENZ-COUMARIN

A mixture of this compound (4.46 g.=0.02 mol) and aqueous sodium hydroxide solution (30 ml. of 10%) was refluxed for a period of eight and a half hours. The hydrolysate was processed as described above and yielded similar material. The yield amounted to 77.5% (4.3 g.).

(c) BY HYDROLYSIS OF 3-CARBOXY-3,4-DIHYDRO-5,6-BENZ-COUMARIN

This acid (2.42 g.=0.01 mol, see preparation below) was dissolved in dilute potassium hydroxide solution (20 ml. of 1.084 N=0.02168 mol) and the mixture was diluted to a volume of 50 ml. After standing at room temperature for thirty minutes, 2 ml. of the reaction mixture were pippetted off and titrated against standard hydrochloric acid. The results indicated that the reaction was virtually complete. A second titration after a further thirty minutes gave the same result.

The residual solution was ice-cooled and neutralized by the addition of an equivalent quantity of dilute hydrochloric acid (10 ml. of 2 N). When crystallisation had proceeded for one hour the crystalline product was filtered off, washed with water and dried in vacuo over phosphorus pentoxide. The yield of [2-hydroxynaphthyl - (1)] - methyl - malonic acid monohydrate amounted to 65% (1.65 g.).

(d) BY HYDROLYSIS OF [2-HYDROXY-NAPHTHYL-(1)]-METHYL-MALONITRILE

The crude nitrile (55.5 g.=0.25 mol) was refluxed with sodium hydroxide solution (500 ml. of 10%) for fifteen hours. The cooled mixture was filtered and dilute hydrochloric acid (400 ml. of 2 N) was added—a gelatinous precipitate which separated was filtered off. The clear filtrate was cautiously acidified to Congo red test paper with dilute hydrochloric acid. Crystallisation soon commenced. After standing at 0° C. for several hours the product was filtered off, washed with water and dried in vacuo over phosphorus pentoxide. The yield of [2-hydroxynaphthyl-(1)]-methyl-malonic acid monohydrate amounted to 77.5% (53.2 g.).

(e) BY HYDROLYSIS OF BENZYL 3,4-DIHYDRO-5,6-BENZ-COUMARIN-3-CARBOXYLATE

A mixture of the above ester (16.6 g.=0.05 mol), dilute sodium hydroxide solution (100 ml. ca. 2 N) and ethanol (100 ml.) was shaken at 15° C. for 16 hours. The solution was then evaporated to dryness under reduced pressure (water pump), the residue dissolved in water (ca. 100 ml.) and the solution cooled to 0° C. and treated with a quantity of dilute hydrochloric acid equivalent to the sodium hydroxide used for the hydrolysis. Further processing as (a) above yield similar material. Yield=70.5% (9.75 g.).

B2. *3-carboxy-3,4-dihydro-5,6-benz-coumarin*

(a) BY THE HYDROGENOLYSIS OF BENZYL 3,4-DIHYDRO-5,6-BENZ-COUMARIN 3-CARBOXYLATE

To a pre-reduced catalyst of Adams palladium oxide (0.2 g.) and 10% palladium charcoal (0.2 g.) in dry ethyl acetate (25 ml.) was added a solution of the above benzyl ester (4.98 g.=0.015 mol) in ethyl acetate (150 ml.). The mixture was then shaken in a hydrogen atmosphere until absorption ceased (365 ml. in two hours). The catalyst was filtered and the filtrate was evaporated in vacuo to a volume of ca. 75 ml. and treated with petrol. The precipitated solid was filtered and washed with petrol. After air drying, the yield of 3,4-dihydro-5,6-benz-coumarin-3-carboxylic acid amounted to 76% (2.75 g.). It melted at 124–125° C. and had an equivalent weight of 239 (theory 242).

(b) BY CYCLISATION OF [2-HYDROXY-NAPHTHYL-(1)]-METHYL MALONIC ACID

The above acid (27.8 g.=0.1 mol) was dissolved in glacial acetic acid (50 ml.) with slight warming (not more than 45° C.), the solution cooled and treated with a saturated solution of hydrogen bromide in acetic acid (5 ml.). Crystallisation commenced almost at once. After thirty minutes, a mixture of benzene (100 ml.) and petrol (100 ml.) was added and the solid was filtered and washed with benzene/petrol and finally petrol. The crude material, M. P. 142–143° C., was dried over phosphorus pentoxide and potassium hydroxide. This material (24.05 g.) was dissolved in hot acetone (100 ml.), the solution charcoaled and filtered and diluted with 40/60° petrol (100 ml.) until crystallisation commenced. After some time, a further amount of petrol (100 ml.) was added and the solid was filtered off and washed with petrol. The mother liquors were evaporated and the crude solid recrystallised in the same way The combined crops (19.25 g. + 2.5 g.) of 3,4-dihydro-5,6-benz-coumarin-3-carboxylic acid amounted to 90% (21.75 g.). This material melted at 146–147° C. and had an equivalent weight of 240 (theory 242).

C1. 1-[substituted-aminomethyl]-2-[2'-hydroxy-naphthyl-(1')]-propionic acids

1-dimethylaminomethyl-2-[2'-hydroxy-naphthyl-(1')]-propionic acid (a) FROM [2-HYDROXY-NAPHTHYL-(1)]-METHYL-MALONIC ACID

[2-hydroxy-naphthyl-(1)]-methyl-malonic acid (69.5 g.=0.25 mol) in water (250 ml.) was treated with an aqueous solution of dimethylamine (50 ml. of 22.5% w./v.=0.25 mol). The mixture was cooled to 0° C. and formalin (18.75 ml. 40% w./v.) was added and the reaction mixture was allowed to stand at room temperature for five days.

The separated solid was filtered, washed with methanol and acetone and air dried. The mother liquors concentrated to low bulk gave a further amount of the same material. The yield of 1-dimethylaminomethyl-2-[2'-hydroxy-naphthyl-(1')]-propionic acid amounted to 90% (61.4 g.). It melted at 190–192° C.

(b) FROM 3-CARBOXY-3,4-DIHYDRO-5,6-BENZ-COUMARIN

The above acid (2.21 g.) in water (10 ml.) was treated with an aqueous solution of dimethylamine (1.83 ml. 22.5% w./v. and the mixture was cooled, treated with formalin (0.685 ml. of 40% w./v.) and kept for 5 days in the refrigerator. The solution was evaporated in vacuo and the residue was treated with acetone (50 ml.). The solid was filtered and washed with acetone. This material was not completely pure and melted at 175–177° C. The properties and analysis were those of the required 1-dimethylaminomethyl-2-[2'-hydroxy-naphthyl-(1')]-propionic acid. Yield=57% (1.55 g.).

C2. 1-diethylaminomethyl-2-[2'-hydroxy-naphthyl-(1')]-propionic acid

[2-hydroxy-naphthyl-(1)]-methyl-malonic acid (11.1 g.=0.04 mol) in water (40 ml.) was treated with diethylamine (2.92 g.=0.04 mol). The mixture was cooled to 0° C. and formalin (3 ml. 40% w./v.) was added and the reaction mixture was allowed to stand at room temperature for 9 days. The mixture was then evaporated under reduced pressure and the residue taken up on acetone and allowed to crystallise. This crystalline product was filtered and washed with acetone. In order to obtain pure material it was necessary to recrystallise from methyl ethyl ketone. This treatment gave pure 1-diethylaminomethyl-2-[2'-hydroxy-naphthyl-(1)]-propionic acid. The yield amounted to 32.5% (3.9 g.) and the compound had M. P. 147–148° C.

C3. 1-morpholinomethyl-2-[2'-hydroxy-naphthyl-(1')]-propionic acid

This was obtained by replacing the diethylamine in the procedure of the foregoing section 2 by an equivalent amount of morpholine (3.48 g.=0.04 mol). Further processing was carried out in a similar manner but in this instance a pure product was obtained without further recrystallisation. The yield of 1-morpholinomethyl-2-[2'-hydroxy-naphthyl-(1')]-propionic acid monohydrate amounted to 64% (8.6 g.). It melted at 105–107° C.

C4. 1-piperidinomethyl-2-[2'-hydroxynaphthyl-(1')]-propionic acid

This was obtained by replacing the morpholine of section 3 by an equivalent amount of piperidine (3.40 g. =0.04 mol). Processing was carried out in an exactly similar manner. The yield of 1-piperidinomethyl-2-[2'-hydroxy-naphthyl-(1')]-propionic acid monohydrate amounted to 45.5% (6.05 g.). It melted at 122–125° C.

C5. 1-methylaminomethyl-2-[2'-hydroxy-naphthyl-(1')]-propionic acid

The diethylamine of section 2 was replaced by an equivalent quantity of aqueous methylamine solution (3.05 g. 40.7% w./v.=0.04 mol) and the mixture was kept at 15° C. for 14 days. Evaporation of the reaction mixture left a gummy residue which solidified on trituration with ethyl acetate. This crude product was dissolved in methanol and the solution evaporated to low bulk, treated with acetone and refrigerated for 24 hours. The solid was filtered and washed with acetone. The yield of 1-methylaminomethyl-2-[2'-hydroxy-naphthyl-(1')]-propionic acid amounted to 11% (1.15 g.). It melted at 185–187° C.

C6. 1-[N-benzyl-N-methyl-aminomethyl]-2-[2'-hydroxy-naphthyl-(1')]-propionic acid (a) FROM [2-HYDROXY-NAPHTHYL-(1)]-METHYL-MALONIC ACID This was obtained by replacing the morpholine in section 3 by an equivalent quantity of methylbenzylamine. Processing was carried out in the same manner. The yield of 1-benzyl-methylaminomethyl-2-[2'-hydroxy-nahpthyl-(1')]-propionic acid hemihydrate amounted to 28% (4.0 g.). It melted at 170–171° C.

(b) FROM 3-CARBOXY-3,4-DIHYDRO-5,6-BENZ-COUMARIN

The above acid (9.68 g.=0.04 mol) was treated with a mixture of methylbenzylamine (4.84 g.=0.04 mol), water (40 ml.) and ethyl alcohol (40 ml.). To this mixture was added formalin (3 ml. 40% w./v.). After 3 days the reaction mixture was evaporated under reduced pressure and the residual gum dissolved in acetone (50 ml.) and the solution refrigerated. After several days the crystalline solid was filtered and washed with acetone. The properties and analysis were those of 1-benzylmethylaminomethyl-2-[2'-hydroxy-naphthyl-(1')]-propionic acid hemihydrate. Yield=33% (4.75 g.).

D. 1-methyl-1,2,3,4-tetrahydro-5,6-benz-quinoline-3-carboxylic acid (a) FROM 1-DIMETHYLAMINOMETHYL-2-[2'-HYDROXY-NAPHTHYL-(1')]-PROPIONIC ACID 1-dimethylaminomethyl-2-[2'-hydroxy-naphthyl-(1)]-propionic acid (2.73 g.=0.01 mol) and excess aqueous methylamine solution (15 ml. of 40% w./v.) were heated to 200° C. in a sealed tube for eighteen hours. At the end of this period the tube was cooled and the contents diluted with an equal volume of water. The crystalline solid which separated was filtered, washed with water and dried in vacuo over phosphorus pentoxide. Its properties showed it to be the methylamide of the required acid. The yield amounted to 63% (1.60 g.); the compound melted at 170–174° C.

The filtrate was concentrated to dryness in vacuo and the residue dissolved in water (20 ml.) and treated with concentrated hydrochloric acid (5 ml.). On standing, crystalline material deposited. This was filtered, washed with dilute hydrochloric acid and acetone and air dried. It proved to be the hydrochloride of the required amino-acid. The yield amounted to 32.5% (0.9 g.) and the compound melted at 207–209° C.

The free amino-acid may be obtained by shaking the hydrochloride with sodium acetate solution. It melted at 154–156° C.

(b) FROM THE POTASSIUM SALT OF 1-DIMETHYL-AMINOMETHYL-2-[2'-HYDROXY-NAPHTHYL-(1')]-PROPIONIC ACID 1-dimethylaminomethyl-2-[2'-hydroxy-naphthyl-(1')]-propionic acid (2.73 g.=0.01 mol) was dissolved in a slight excess of ca. N potassium hydroxide solution (10.15 ml. of 1.084 N=0.011 mol), mixed with aqueous methylamine (15 ml. of 40%) and the mixture heated to 200° C. in a sealed tube for eighteen hours.

When processed as described above there was obtained a small yield of the methylamide (150 mg.=6%) and an excellent yield of the hydrochloride of the required amino acid (2.52 g.=91%).

(c) BY HYDROLYSIS OF ITS METHYLAMIDE

The methylamide formed with the above reactions was converted to the amino-acid hydrochloride in the following manner.

The amide (500 mg.) was refluxed with a mixture of 2 N sodium hydroxide (15 ml.) and ethyl alcohol (2 ml.) for twenty-four hours during which period methylamine was evolved.

After cooling, the mixture was diluted with water (10 ml.) and filtered free of traces of insoluble material. The filtrate was evaporated in vacuo to remove alcohol, diluted to ca. 20 ml. and acidified with concentrated hydrochloric acid (3.5 ml.). The solid which separated was filtered off and washed with dilute hydrochloric acid (2 N) and acetone. After air drying the yield amounted to 91.5% (500 mg.). It melted at 207–209° C. undepressed with a genuine sample of the hydrochloride.

(d) FROM THE POTASSIUM SALT OF 1-DIETHYLAMINO-METHYL - 2 - [2'- HYDROXY - NAPHTHYL-(1')]-PROPIONIC ACID

1 - diethylaminomethyl-2-[2'-hydroxy-naphthyl-(1')]-propionic acid (1.50 g.=0.005 mol) was dissolved in a slight excess of ca. N potassium hydroxide solution (5.1 ml. of 1.084 N) mixed with aqueous methylamine (7.5 ml. of 40% w./v.) and heated in a sealed tube at 160–170° C. for 15 hours. Processing as described above yielded the hydrochloride of the required amino acid (1.20 g.=87%).

(e) FROM THE POTASSIUM SALT OF 1-MORPHOLINO-METHYL - 2 - [2'- HYDROXY - NAPHTHYL - (1')]-PROPIONIC ACID

1 - morpholinomethyl-2-[2'-hydroxy-naphthyl - (1')]-propionic acid monohydrate (1.67 g.=0.005 mol) was treated exactly as described in (d) and yielded the hydrochloride of the required amino acid (1.11 g.=80.5%).

(f) FROM THE POTASSIUM SALT OF 1-PIPERIDINO-METHYL - 2 - [2'- HYDROXY - NAPHTHYL - (1')]-PROPIONIC ACID

1 - piperidinomethyl-2-[2'-hydroxy - naphthyl - (1')]-propionic acid monohydrate (1.65 g.=0.005 mol) was treated exactly as described in (d) and yielded the hydrochloride of the required amino acid (1.11 g.=80.5%).

(g) FROM THE POTASSIUM SALT OF 1-METHYLAMINO-METHYL - 2 - [2'- HYDROXY - NAPHTHYL - (1')]-PROPIONIC ACID

1 - methylaminomethyl-2-[2'-hydroxy-naphthyl-(1')]-propionic acid (0.52 g.=0.002 mol) was dissolved in a slight excess of ca. N potassium hydroxide solution (2.05 ml. of 2.084 N) mixed with aqueous methylamine (6 ml. of 40% w./v.) and heated in a sealed tube at 160–170° C. for 15 hours. Processing as described previously yielded the hydrochloride of the required amino acid (0.43 g.=77.5%).

We claim:
1. A compound of the group consisting of 1-methyl-1,2,3,4 - tetrahydro-5,6-benz-quinoline-3-carboxylic acid, the methylamide thereof and salts thereof.
2. A salt of 1-methyl-1,2,3,4-tetrahydro-5,6-benz-quinoline-3-carboxylic acid.
3. 1-methyl-1,2,3,4-tetrahydro - 5,6 - benz-quinoline-3-carboxylic acid.
4. A 1-methyl-1,2,3,4-tetrahydro-5,6-benz - quinoline-3-carboxylic acid hydrohalide.
5. A salt of 1-methyl-1,2,3,4-tetrahydro - 5,6 - benz-quinoline-3-carboxylic acid methyl amide.
6. 1-methyl-1,2,3,4-tetrahydro - 5,6 - benz-quinoline-3-carboxylic acid methyl amide.
7. A process which comprises treating a compound selected from the group consisting of 1-dialkylaminomethyl-2-hydroxy-naphthalene, 1-piperidinomethyl-2-hydroxy-naphthalene and 1-morpholinomethyl-2-hydroxy-naphthalene with a methane derivative represented by the formula CH₂(X)Y, where X is a radical selected from the group consisting of carbalkoxy, carbobenzyloxy and cyano radicals and Y is a radical selected from the group consisting of carbalkoxy and carbobenzyloxy radicals, in the presence of an alkali metal, subjecting the 3-substituted-3,4-dihydro-5,6-benz-coumarin formed to hydrogenolysis, treating the product so obtained with formaldehyde and an amine of the group consisting of piperidine, morpholine, methylamine and a compound of the formula NH(R')R", wherein R' is selected from the group consisting of methyl and ethyl and R" is selected from the group consisting of methyl, ethyl and benzyl, heating an alkali metal salt of the resulting 3-[2-hydroxy-naphthyl-(1)]-2-carboxy-propylamine derivative with methylamine under pressure.

8. A process which comprises treating a compound selected from the group consisting of 1-dialkylaminomethyl-2-hydroxy-naphthalene, 1-piperidinomethyl-2-hydroxy-naphthalene and 1-morpholinomethyl-2-hydroxy-naphthalene with a methane derivative represented by the formula CH₂(X)Y, wherein X is a radical selected from the group consisting of carbalkoxy, carbobenzyloxy and cyano radicals and Y is a radical selected from the group consisting of carbalkoxy and carbobenzyloxy radicals, in the presence of an alkali metal, subjecting the 3-substituted-3,4-dihydro-5,6-benz-coumarin formed to hydrogenolysis, treating the product so obtained with formaldehyde and an amine of the group consisting of piperidine, morpholine, methylamine and a compound of the formula NH(R')R", wherein R' is selected from the group consisting of methyl and ethyl and R" is selected from the group consisting of methyl, ethyl and benzyl, heating the resulting 3-[2-hydroxy-naphthyl-(1)]-2-carboxy-propylamine derivative with methylamine under pressure and hydrolysing the amide produced.

9. A process which comprises heating an alkali metal salt of a compound represented by the formula

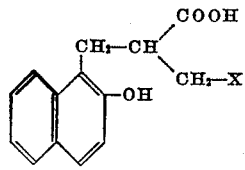

wherein X is a radical selected from the group consisting of piperidino, morpholino, methylamino radicals and those of the formula —N(R')R", R' being selected from the group consisting of methyl and ethyl, and R" being a radical selected from the group consisting of methyl, ethyl and benzyl, with methylamine under pressure to produce 1-methyl-1,2,3,4-tetrahydro-5,6-benz-quinoline-3-carboxylic acid.

10. A process which comprises heating a compound represented by the formula

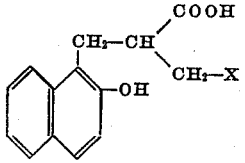

wherein X is a radical selected from the group consisting of piperidino, morpholino, methylamino radicals and those of the formula —N(R')R", R' being selected from the group consisting of methyl and ethyl, and R" being a radical selected from the group consisting of methyl, ethyl and benzyl, with methylamine under pressure to produce 1-methyl-1,2,3,4-tetrahydro-5,6-benz-quinoline-3-carboxylic acid methylamide.

11. A process which comprises treating 1-methyl-1,2,3,4-tetrahydro-5,6-benz-quinoline-3-carboxylic acid methylamide with a hydrolyzing agent to produce 1-methyl-1,2,3,4-tetrahydro-5,6-benz-quinoline-3-carboxylic acid.

No references cited.